(12) United States Patent
Meyer

(10) Patent No.: US 6,499,001 B1
(45) Date of Patent: Dec. 24, 2002

(54) ENGINEERING DATABASE FEEDBACK SYSTEM

(75) Inventor: Theodore O. Meyer, Gresham, OR (US)

(73) Assignee: LSI Logic Corporation, Milpitas, CA (US)

( * ) Notice: Subject to any disclaimer, the term of this patent is extended or adjusted under 35 U.S.C. 154(b) by 406 days.

(21) Appl. No.: 09/596,909

(22) Filed: Jun. 20, 2000

(51) Int. Cl.$^7$ ............................................. G06F 19/00

(52) U.S. Cl. ..................... 702/187; 702/84; 700/121

(58) Field of Search ............................ 700/108, 109, 700/116, 121; 702/187, 84; 438/14

(56) References Cited

U.S. PATENT DOCUMENTS

| | | | | |
|---|---|---|---|---|
| 5,761,064 A | * | 6/1998 | La et al. ..................... | 700/110 |
| 6,000,830 A | * | 12/1999 | Asano et al. ............... | 700/100 |
| 6,049,803 A | * | 4/2000 | Szalwinski .................. | 707/100 |
| 6,256,549 B1 | * | 7/2001 | Romero et al. ............... | 29/622 |
| 6,263,255 B1 | * | 7/2001 | Tan et al. .................... | 700/106 |
| 6,366,824 B1 | * | 4/2002 | Nair et al. ................... | 700/110 |
| 6,430,572 B1 | * | 8/2002 | Steffan et al. ................ | 438/14 |

\* cited by examiner

*Primary Examiner*—Patrick Assouad
(74) *Attorney, Agent, or Firm*—Luedeka, Neely & Graham, P.C.

(57) ABSTRACT

A computerized engineering database feedback system provides special processing instructions for processing materials in a production process, and provides historical information related to the materials processed according to the special processing instructions. The system includes a request entry device through which requesting personnel may input special processing information indicating a way to process the materials differently from a normal way of processing of the materials. An instruction processing device receives the special processing information and generates the special-processing instructions based thereon. A process station device receives the special-processing instructions, and presents the special-processing instructions to material-processing personnel. The process station device also provides for inputting material information from the material-processing personnel, where the material information indicates one or more characteristics of the material processed according to the special-processing instructions. The system also includes a relational database in which the special processing information and the material information are compiled and related. An information retrieval device accesses the relational database, searches the relational database for material information related to special processing information, or searches the relational database for special processing information related to material information. Using the system, an engineer who wishes to have a lot of material processed in a special way for an engineering experiment may provide process operators with special-processing instructions. The system also allows the process operators to input information and test data related to the material that is processed according to the special instructions. Further, the system makes the results of the engineering experiment readily available to the company community in the relational database. By accessing the database, company engineers may view the results of previously-conducted experiments, and may thereby avoid wasting company resources by unnecessarily repeating the same experiments.

16 Claims, 3 Drawing Sheets

ENGINEERING DATABASE FEEDBACK SYSTEM

FIELD

This invention relates to the field of process control. More particularly the invention relates to generating instructions for controlling a process according to an engineering run request, and compiling information concerning materials that are processed according to the engineering run request.

BACKGROUND

Engineers involved in the design and fabrication of semiconductor devices and materials are constantly seeking ways to make improvements to the product or the manufacturing process used to fabricate the product. To make these improvements, engineers at times wish to perform experiments involving changes to the process or "recipe." The materials processed according to the changed recipe are tested and data is collected to determine whether the changes had the desired effect.

Conventionally, engineers request changes in the manufacturing process by filling out a form, referred to as an Engineering Run Request (ERR). The Engineering Run Request provides specific engineering-related processing instructions that change the process flow used on a particular lot of material. The Engineering Run Request instructions may request additional inspections or processing that is completely different than normal to produce "skew lots." After completion by the engineer, the Engineering Run Request typically receives a number of approval signatures before it may be implemented Once submitted and approved, the Engineering Run Request is associated with a particular lot of material as the material moves through the factory. At each step in the process flow, the process operators must determine, based on the Engineering Run Request form, what changes in the process are requested, and to which lot of material the changes apply.

Typically, once the materials are processed according to the Engineering Run Request, the requesting engineer collects and analyzes engineering data on the lot of material to verify whether the experiment was successful. A material review board must then determine whether the material meets a customer's requirements so that it may be shipped to the customer, or whether the material must be scrapped.

There are several problems with this conventional scenario. First, the engineer may not include enough detail in the Engineering Run Request for the process operators to completely understand what changes are being requested. Even if the changed process steps are correctly stated on the Engineering Run Request, the operator may perform the steps incorrectly, or perform the changed steps on the wrong lot of material.

The engineering data collected by the engineer is often never reported, but instead ends up in the engineer's files where it is never seen by other interested parties. Later, another engineer at the same or another manufacturing facility who is not aware of the other engineer's work requests the same or a similar experiment on another lot of material. This duplication of effort consumes engineering time and wastes company resources.

When the material review board must determine what to do with the lot of material processed according to an Engineering Run Request, they typically must call the engineer to their meeting to present the results of the experiment. This is another waste of time and resources.

What is needed, therefore, is an automated system for reliably providing to process operators process change instructions associated with an engineering experiment, verifying that the process changes have been correctly implemented at each step in the process, and making the results of the engineering experiment readily available to the company community.

SUMMARY

The above and other needs are met by a computerized system for providing special processing instructions for processing materials in a production process, and for providing historical information related to the materials processed according to the special processing instructions. The system includes a request entry device through which requesting personnel may input special processing information indicating a way to process the materials differently from a normal way of processing of the materials. An instruction processing device, which is linked to the request entry device, receives the special processing information and generates the special-processing instructions based thereon. A process station device, which is linked to the instruction processing device, receives the special-processing instructions, and presents the special-processing instructions to material-processing personnel. The process station device also provides for inputting material information from the material-processing personnel, where the material information indicates one or more characteristics of the material processed according to the special-processing instructions. The system also includes a relational database in which the special processing information and the material information are compiled and related. An information retrieval device, which is linked to the relational database, accesses the relational database, searches the relational database for material information related to special processing information, or searches the relational database for special processing information related to material information.

Using the system, an engineer who wishes to have a lot of material processed in a special way for an engineering experiment may provide process operators with special-processing instructions. The system also allows the operators to input information and test data related: to the material that is processed according to the special instructions. Further, the system makes the results of the engineering experiment readily available to the company community in the relational database. By accessing the database, company engineers may view the results of previously-conducted experiments, and may thereby avoid wasting company resources by unnecessarily repeating the same experiments.

In preferred embodiments, the instruction processing device generates the special-processing instructions as a sequential list of actions to be performed to process the materials according to the special processing information, and provides an action from the list to the process station device for presentation to the material-processing personnel. The process station device receives the action from the instruction processing device, presents the action to the material-processing personnel, and receives input from the material-processing personnel indicating that the action is complete. Based on the input from the material-processing personnel indicating that the action has been completed, the process station device generates an action-complete indication and provides the action-complete indication to the instruction processing device. Only after the instruction processing device has received the action-complete indication associated with the most previous action does it provide a next action from the sequential list to the process station device. In this manner, the system ensures that the material-processing personnel proceed to the next action in the list only after completing all previous actions in the list.

In another aspect, the invention provides a method for providing special-processing instructions for processing materials in a production process, and for providing historical information related to the materials processed according to the special-processing instructions. The method includes (a) inputting special processing information indicating a way to process the materials differently from a normal way of processing of the materials, (b) generating the special-processing instructions based on special processing information, (c) presenting the special-processing instructions to material-processing personnel, and (d) receiving material information from the material-processing personnel, where the material information indicates one or more characteristics of the material processed according to the special-processing instruction The method also includes (e) compiling and relating the special processing information and the material information in a relational database.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
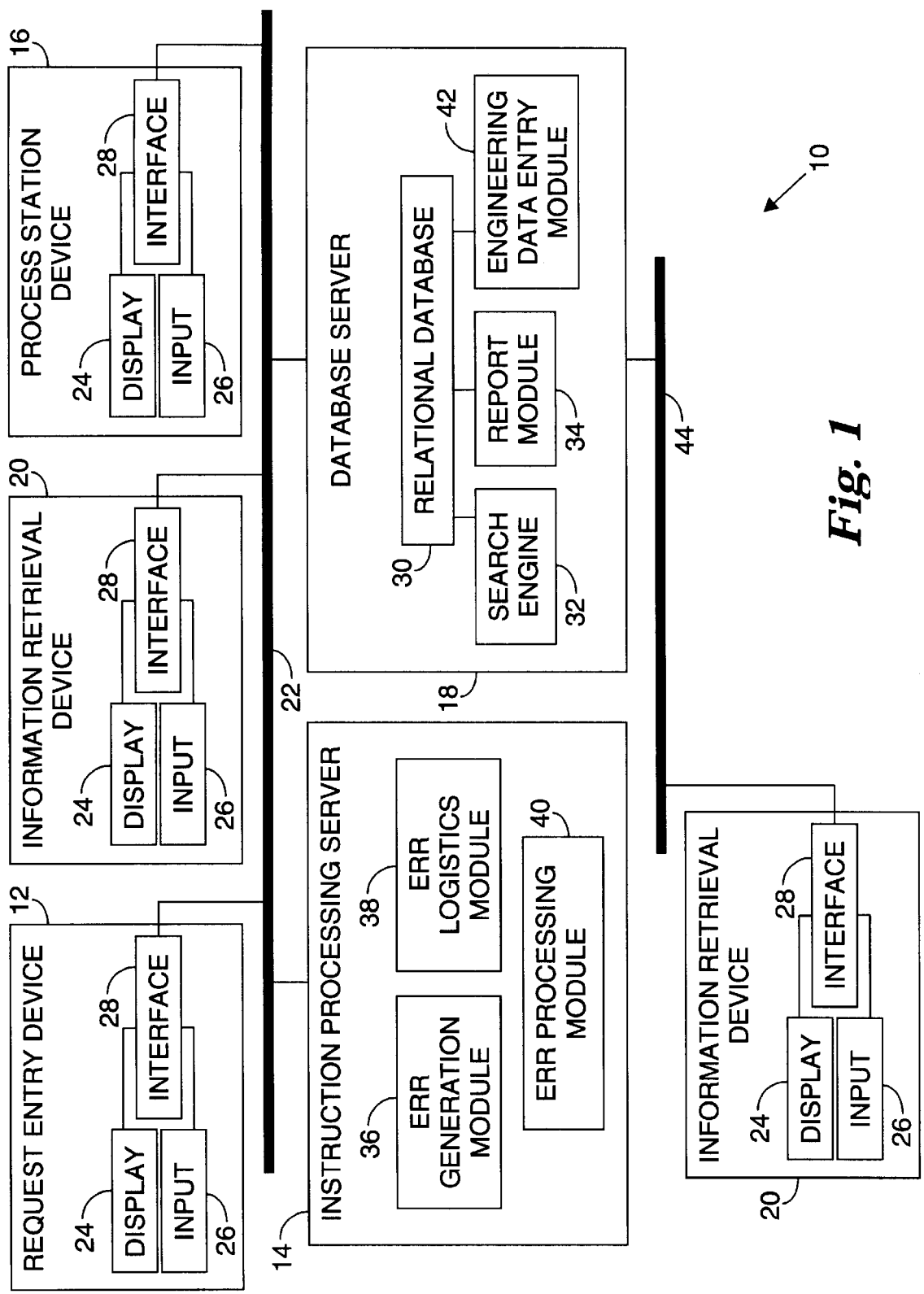
FIG. 1 is a functional block diagram of an engineering database feedback system according to a preferred embodiment of the present invention.

Referring now to FIG. 1, there is depicted a computerized engineering database feedback system 10. The system 10 provides production process operators with special-processing instructions for processing materials according to a special engineering request. The system 10 also compiles historical information related to the materials processed according to the special-processing instructions. The following description of the system 10 is directed to processing and testing semiconductor wafers. However, it should be appreciated that the system 10 is applicable to processes for manufacturing and testing a wide variety of materials and products.

In a preferred embodiment, the system 10 includes one or more request entry devices 12, an instruction processing server 14, one or more process station devices 16, a database server 18, and one or more information retrieval devices 20, all of which are linked by a first communication network 22. Preferably, the first communication network 22 is a local area network, but it may also be a wide area network or some other type of network.

In a preferred embodiment, the request entry devices 12 are computers, such as personal computers. Alternatively, the request entry devices 12 are network terminals, each consisting of a display device 24, an input device 26, and a network interface device 28. Although one request entry device 12 is depicted in FIG. 1, the invention is not limited to, any particular number of request entry devices. There may be many such devices 12 connected to the network 22 and located in engineering offices and computing centers throughout a company facility. As described in more detail below, an engineer uses a request entry device 12 to make an engineering request for special processing of a lot of material.

The instruction processing server 14, such as a personal computer, is also connected to the network 22 by an internal interface card, such as an Ethernet card. As described in more detail below, the instruction processing server 14 receives an engineering request via the network 22 from a request entry device 12, and generates a set of production process instructions based on the request.

Preferably, the process station devices 16 are computers, such as personal computers. Alternatively, the process station devices 16 are network terminals, each consisting of a display device 24, input device 26, and network interface device 28. As with the request entry devices 12, the invention is not limited to any particular number of process station devices 16. In the preferred embodiment, there is at least one process station device 16 associated with each process station in a manufacturing facility. For purposes of this description, it should be understood that a process station may include any location within a manufacturing facility at which a fabrication step, inspection step, or test step is performed. As described in more detail below, a process operator uses a process station device 16 to receive process instructions from the central instruction processing server 14, and to input information in regard to the process station.

The database server 18, such as a personal computer, is connected to the network 22 by way of an interface card. The database server 18 includes memory and software for storing and accessing a relational database 30. The relational database 30 is a database for compiling process instructions from the instruction processing server 14, test data from the process station devices 16, lot identification numbers, lot processing dates, and other lot information as described in more detail below. The relational database 30 relates the instructions associated with a particular lot of material with the test data and other information associated with the same lot of material. As the phrase is used herein, the relational database 30 refers to a memory device on the database server 18 for storing the instruction information, test data, :and other lot-related information, as well as database software for relating and sorting the information. As described in more detail hereinafter, the relational database 30 preferably includes a report module 34 and is searchable by a search engine module 32.

According to the preferred embodiment of the invention shown in FIG. 1, the relational database 30 resides on the dedicated database server 18. However, it should be appreciated that the invention is not limited to the configuration of the machine on which the relational database 30 resides. The relational database could reside on the database server 18, on the instruction processing server 14, or on any other computer connected to the network 22.

Preferably, the information retrieval devices 20 are computers, such as personal computers. Alternatively, the information retrieval devices 20 are network terminals, each consisting of a display device 24, input device 26, and network interface device 28. As with the request entry devices 12 and the process station devices 16, the invention is not limited to any particular number of information retrieval devices 20. As described in more detail below, the information retrieval devices 20 are used to access the relational database 30 to search for instruction information, test data, and other material information.

Referring now to FIG. 1 and the flow-chart of FIG. 2, the operation of the system 10 will be described. Preferably, the system 10 will be used by engineering personnel to initiate a special production process run of material, also referred to herein as an "engineering run," to gather information to make improvements to the material or the processing of the material. The first step in initiating an engineering run is the generation of an Engineering Run Request (ERR) (step 100). In the preferred embodiment, the Engineering Run Request is a computer record indicating all of the process steps involved in fabricating and testing the materials, such as semiconductor wafers. Generation of the Engineering Run Request is preferably controlled by a software module, referred to herein as an ERR generation module 36, running on the instruction processing server 14. The ERR generation module 36 is executable from the request entry devices 12, and alternatively from any other computer or terminal on the network 22.

In the preferred embodiment, when the engineer runs the ERR generation module 36, the module 36 generates a graphic display at the request entry device 12 presenting to the engineer the standard process step instructions followed during a normal production run of the material. At this point, the engineer may modify the instructions to generate modified or "special" process instructions to be followed during an engineering run. For example, the engineer may specify a different set of process temperatures or pressures for a particular process step. Alternatively, the engineer may specify that different or additional testing be performed on the material at a particular step. These changes to the instructions are preferably performed using keyboard or "point-and-click" graphical user interface processing.

Preferably, the ERR generation module 36 also presents to the engineer a summary dialog box wherein the engineer may enter a brief summary of the purpose of the engineering run, and any pertinent comments. This summary is stored with the special instructions in the Engineering Run Request record.

When the engineer is satisfied with the special processing instructions and the summary, the ERR generation module 36 saves the Engineering Run Request record with a particular Engineering Run Request identifier which is preferably included in the file name of the Engineering Run Request record. Once saved in memory on the instruction processing server 14, the Engineering Run Request record is accessible to other computers on the network 22, as described in more detail hereinafter. Preferably, when the Engineering Run Request record is later opened, such as on a process station device 16, the instructions that are different from standard instructions are highlighted, such as in a different color text.

In the preferred embodiment of the invention, the special processing instructions in the Engineering Run Request record are also stored in memory, such as in the form of a numbered list in a text file (step 102).

After the Engineering Run Request record is generated, logistics personnel may open the Engineering Run Request record using a ERR logistics module 38 running on the instruction processing server 14. Using the ERR logistics module 38, the logistics personnel may view the processing instructions, and decide based thereon which lot of material to assign to the particular Engineering Run Request (step 104). For example, if only the last few steps are modified from a normal process flow, the logistics personnel may assign a lot of material that has already undergone the standard process steps, but not the modified or new steps. Once a lot of material has been assigned to a particular Engineering Run Request, logistics personnel assign a lot identifier to the lot, and the ERR logistics module 38 writes the lot identifier into the Engineering Run Request record. Individual wafers within a lot may also be given identifiers. Preferably, a barcode or other identification device containing the Engineering Run Request identifier and lot identifier is attached to the lot, such as to a wafer carrier containing the lot of wafers. At this point, logistics personnel may use the ERR logistics module 38 to note any holds that apply to the lot and add other comments to a logistics field within the Engineering Run Request record.

In the preferred embodiment, when a lot identifier has been assigned to a particular lot, the lot identifier is also written to memory (step 106).

The lot of material assigned to a particular Engineering Run Request is transferred to a process station within the factory where the first process step in the Engineering Run Request is to be performed (step 108). Via the network 22 and using the process station device 16, a process operator executes an ERR processing module 40, which is preferably a server-based application running on the instruction processing server 14. When executed, the ERR processing module 40 requests input of the Engineering Run Request identifier for the lot to be processed. To avoid input errors, the identifier is preferably read from a barcode on the wafer carrier using a barcode reader interfaced to the process station device 16. Alternatively, the Engineering Run Request identifier may be typed in manually.

Once the Engineering Run Request identifier is entered, the ERR processing module 40 opens the Engineering Run Request record (step 110). Preferably, each process instruction in the Engineering Run Request record is associated with a software flag stored in the Engineering Run Request record. A set flag indicates that the associated process step has been successfully performed on the lot of material. When the Engineering Run Request record is opened, the Engineering Run Request processing module 40 determines whether flags are set for all previous steps (step 112). If a flag is not set for any process step that should have occurred prior to the current step, the ERR processing module 40 returns an error message (step 114). Preferably, the error message indicates to the process operator which step in the process flow is lacking, so that the process operator may take appropriate corrective action. If an error message is returned at this point, the ERR processing module 40 will not allow further processing of the Engineering Run Request instruction list. This prevents inadvertent skipping of critical steps in the material processing.

If the Engineering Run Request record indicates that all previous processing steps have been completed, the ERR processing module 40 displays the Engineering Run Request instruction list to the process station operator on the display 24 of the process station device 16 (step 116). Preferably, the instruction for the current process step is highlighted in the displayed Engineering Run Request instruction list. Alternatively, only the instruction for the current step is displayed. In either case, the ERR processing module 40 preferably allows the operator to browse through other steps in the instruction list to gather more information as necessary.

Based on the displayed instructions, the operator then performs the process step (step 118). For example, the instructions may instruct the operator to insert a wafer carrier into a processing chamber, close an airlock, evacuate the chamber, and set the chamber controls to achieve a certain processing temperature and pressure. Preferably, for each instruction in the list, the operator enters a step-complete indication using graphical user interface processing on the process station device 16 (step 120). The step-complete indication may be a process-complete indication or a test-complete indication, depending on the nature of the step being performed. For example, the ERR processing module 40 may request that the operator place a "check" in a displayed dialog box next to a completed process step. Other steps may require entry of read-out values from meters provided on the processing equipment. These requirements aid the operator in making sure that each instruction is carried out in the proper order.

Some process steps require data to be collected that characterizes some property of the processed material. According to the invention, such data is downloaded from a test instrument at the process station to the process station device 16, such as over an RS-232 bus. Preferably, the ERR processing module 40 writes this data to memory in the process station device 16 where it is stored for later download to the relational database 30.

The ERR processing module 40 next determines whether there are further steps to be performed in processing the materials (step 124). If not, the requesting engineer is notified that all processing steps have been completed in the engineering run (step 126). In the preferred embodiment of the invention, the ERR processing module 40 automatically notifies the engineer by activating an email application to send an email message to the engineer's email address. The ERR processing module 40 then closes the Engineering Run Request record (step 128). As depicted in FIG. 2B, the ERR processing module 40 also preferably notifies logistics personnel, such as by email, that the lot has completed processing and is ready to be moved to a storage area (step 134).

Figure 2A:
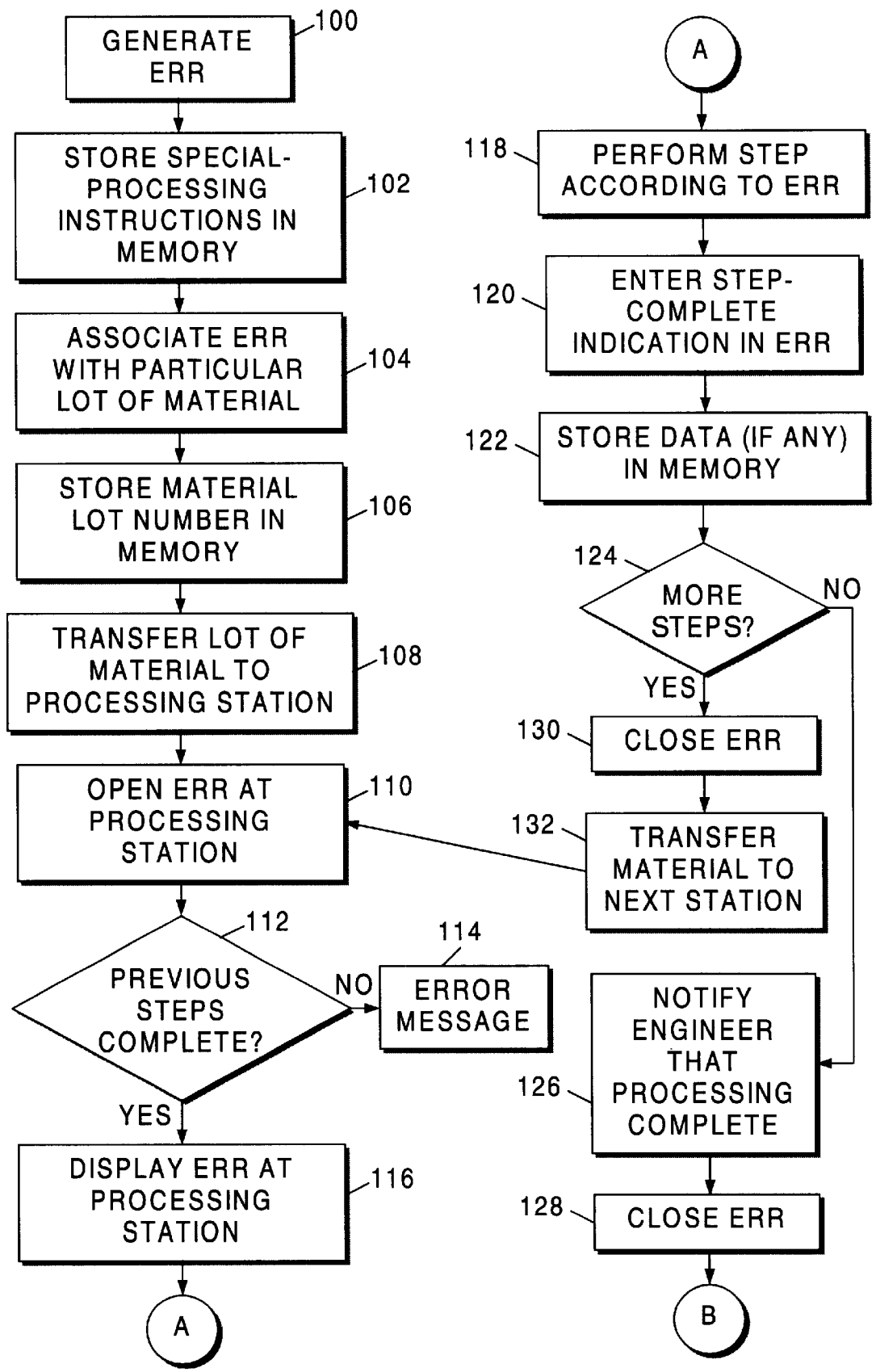
FIGS. 2A and 2B depict a flow chart for a preferred embodiment of a method according to the present invention.
Figure 2B:
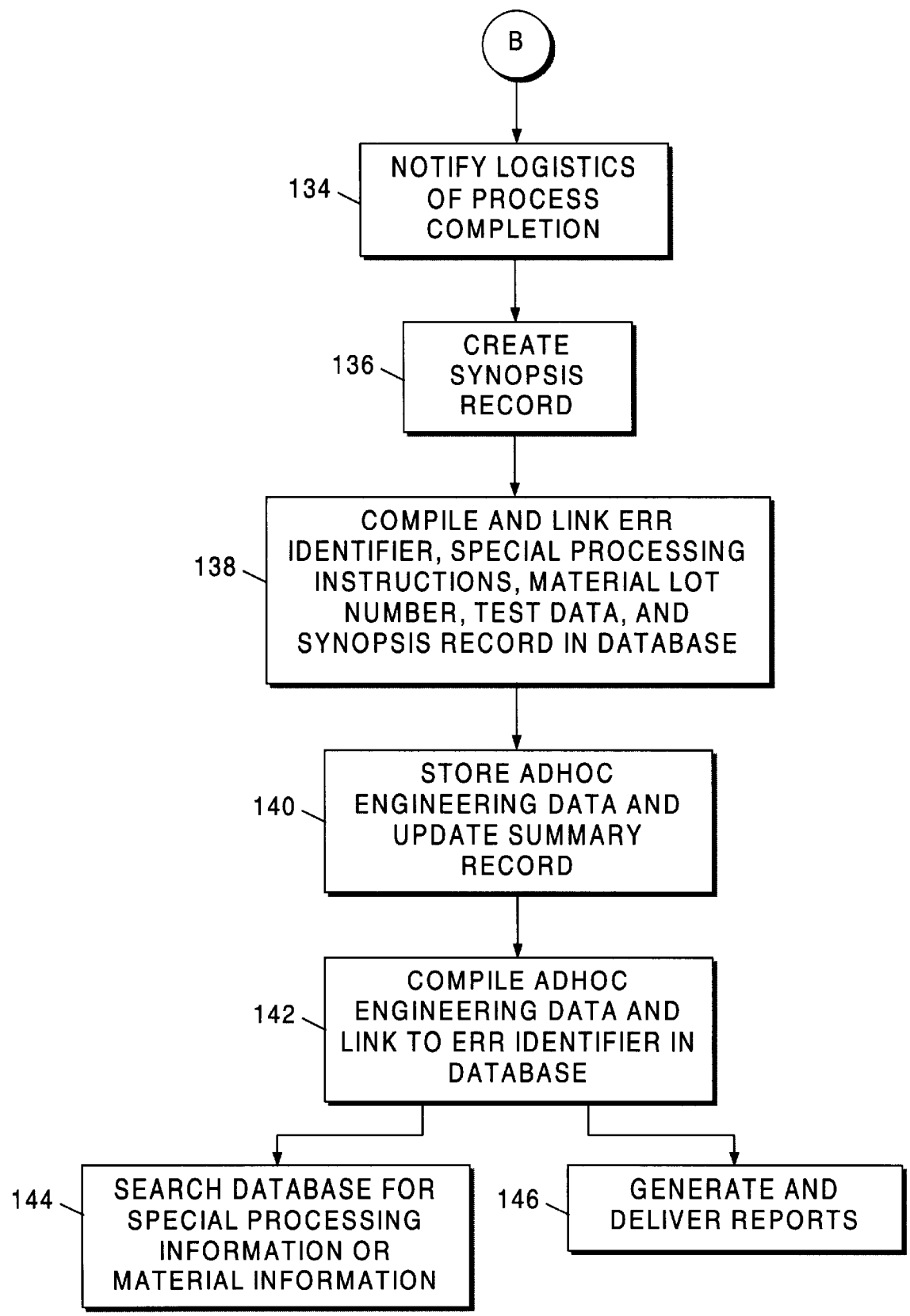

With reference to FIG. 2A, if the ERR processing module 40 determines that there are further steps to be performed in processing the materials (step 124), the Engineering Run Request record is closed (step 130), and the lot of material is transferred to the next processing station (step 132). Steps 110–124 of FIG. 2 are then repeated until all of the instructions in the list for all of the process steps have been completed.

As shown in FIG. 2B, when Engineering Run Request processing is complete, the report module 34 creates a synopsis record for later use by the search engine 32 (step 136). Preferably, the synopsis record contains a list of keywords that the report module 34 extracts from the text of the special processing instructions and the summary included in the Engineering Run Request record.

In the preferred embodiment, after creation of the synopsis record (step 136), the Engineering Run Request identifier, the special processing instructions, the material lot number, the test data, and the synopsis record are compiled and linked in the relational database 30 (step 138). This step may involve retrieving records stored in memory on the request entry device 12, the instruction processing server 14, and the process station device 16. Alternatively, these records may have been previously written to memory in the database server 18 during the Engineering Run Request processing.

In addition to storing test data as part of an Engineering Run Request processing step, a preferred embodiment of the present invention provides for storing engineering data that is related to the lot of material processed according to the Engineering Run Request, but which is collected outside of the Engineering Run Request processing loop (step 140). Such adhoc engineering data may be entered into the system 10 and stored in memory, preferably on the database server 18, using an engineering data entry module 42. The engineering data entry module 42 is preferably a server-based application running on the database server 18 providing a graphical user interface that allows the engineer to add additional comments to the Engineering Run Request summary, and that provides for data import in a wide variety of file formats. Preferably, the engineering data entry module 42 also updates the synopsis record with additional keywords culled from the comments added to the Engineering Run Request summary. When adhoc engineering data is entered, it is compiled in the relational database 30 and is linked to the Engineering Run Request identifier (step 142).

The search engine 32 provides for searching the relational database 30 (step 144) in a number of different ways, including quick searches of the synopsis records and deeper searches of the raw data and text records that are linked in the database 30. Preferably, the search engine 32 is a server-based application which is accessible from any computer on the network 22. In this manner, the special processing instructions followed in processing an engineering run of material, and test data collected on the material, are readily accessible to all functional groups within the company community.

For example, an engineer who is working on improving an oxide deposition process could access the database 30, search for keywords such as "oxide deposition" using the search engine 32, and get a listing of all Engineering Run Request's in the system that include these words in a keyword list. The engineer could then access the Engineering Run Request summary files to learn details of the experiments performed in the listed Engineering Run Request's. The engineer would also have ready access to the test results that were obtained during the previous work.

As another example, consider a situation in which a test engineer has found several zero-yield wafers in a lot. The engineer could access the database 30, enter into the search engine 32 the lot number or an identification number of one of the wafers in the lot, and find the Engineering Run Request record for the engineering run in which the wafers were processed. The engineer could then review the Engineering Run Request summary record associated with the lot, and determine that the wafers were processed with a different implant, for example, as part of an experiment.

As a further example, a quality engineer could access the database 30 during a material review board meeting, enter a particular lot number into the search engine 32, find the Engineering Run Request record for the lot, and determine based on the Engineering Run Request record how the wafers were processed and whether the wafers meet all of the customer's quality requirements. This is much more efficient than having to call the engineer that requested the Engineering Run Request into the material review board meeting to explain the situation.

The report module 34 is also preferably a server-based application that may be executed via the networks 22 and 44. The report module 34 provides for printing and exporting summary records and test data in a variety of formats (step 146). In the preferred embodiment, the report module 34 is capable of scheduling reports to be automatically sent to various locations and/or personnel throughout a company. For example, the report module 34 may be programmed to automatically provide a report via email to a particular engineer whenever an Engineering Run Request record becomes available that includes a particular keyword in the synopsis record. The report module 34 is also preferably capable of automatically generating a report document in hypertext markup language (HTML) that may be accessed via the Internet on the company's World Wide Web site, or on the company intranet.

In a preferred embodiment of the invention, as shown in FIG. 1, the database server 18 is also connected to a second computer network 44. The second computer network 44 may be a company intranet connecting one engineering or manufacturing facility to another engineering or manufacturing facility. Alternatively, the second network 44 may be a global computer network, such as the Internet.

Connected to the second computer network 44 are one or more information retrieval devices 20, such as described above. Using an information retrieval device 20 connected to the network 44, an engineer located at one company facility may access the database server 18 located in another company facility. In this manner, engineers throughout a company may share and access Engineering Run Request records generated at any company facility. Such company-wide access to engineering test results eliminates the duplication of effort that in the past has been a drain on company resources.

Preferably, the relational database 30 is a server-based application having multi-level password protection and providing a "thin" client interface, thus minimizing the consumption of local computing resources. Since the database 30 may be accessed simultaneously by multiple users across the networks 22 and 44, it provides record locking during data entry or editing of Engineering Run Request records.

It is appreciated that the invention as described above comprehends numerous adaptations, rearrangements, and substitutions of parts, all of which are considered to be within the scope and spirit of the invention as described, and that the scope of the invention is only to be restricted by the language of the claims given below.

What is claimed is:

1. A computerized system for providing special processing instructions for processing materials in a production process, and for providing historical information related to the materials processed according to the special processing instructions, the system comprising:

a request entry device through which requesting personnel input special processing information indicating a way to process the materials differently from a normal way of processing of the materials, an instruction processing device linked to the request entry device for receiving the special processing information and generating the special-processing instructions based thereon, a process station device linked to the instruction processing device for receiving the special-processing instructions, for presenting the special-processing instructions to material-processing personnel, and for inputting material information from the material-processing personnel, where the material information indicates one or more characteristics of the material processed according to the special-processing instructions, a relational database in which the special processing information and the material information are compiled and related, and an information retrieval device linked to the relational database, for accessing the relational database, for searching the relational database for material information related to special processing information, or for searching the relational database for special processing information related to material information.

2. The computerized system of claim 1 further comprising:

the instruction processing device for generating the special-processing instructions as a sequential list of actions to be performed to process the materials according to the special processing information, and providing an action from the list to the process station device for presentation to the material-processing personnel, the process station device for receiving the action from the instruction processing device, presenting the action to the material-processing personnel, receiving input from the material-processing personnel indicating that the action is complete, generating an action-complete indication based on the input from the material-processing personnel indicating that the action has been completed, and for providing the action-complete indication to the instruction processing device, and the instruction processing device further for receiving the action-complete indication from the process station device, providing to the process station device a next action from the sequential list only after the action-complete indication associated with a most previous action is received, whereby the material-processing personnel may proceed to a next action in the list only after completing all previous actions in the list.

3. The computerized system of claim 2 wherein:

the instruction processing device generates the sequential list of actions including material-processing actions and material-testing actions, and the process station device generates a test-complete indication based on test data provided by the material-processing personnel indicating that a material-testing action has been completed, and generates a process-complete indication based on input provided by the material-processing personnel indicating that a material-processing action has been completed.

4. The computerized system of claim 3 further comprising:

a communication network coupled to the instruction processing device and the process station device, the process station device associated with one or more material-processing actions or material-testing actions to be performed at a material-processing station or a material-testing station within a processing plant, and the instruction processing device for providing each one of the actions from the sequential list to the associated process station device via the communication network.

5. The computerized system of claim 1 further comprising:

a communication network coupled to the instruction processing device and the process station device, and the process station device associated with a production station at which one or more of the special-processing instructions are performed to process the materials.

6. The computerized system of claim 1 further comprising:

a communication network linked to the relational database and the information retrieval device, and the information retrieval device for accessing the relational database via the communication network, for searching the relational database for material information related to special processing information, or for searching the relational database for special processing information related to material information.

7. The computerized system of claim 1 wherein the relational database includes a synopsis file associated with the special processing information and the material information, the synopsis file providing a summary of the special processing information and the material information.

8. The computerized system of claim 7 further comprising:
   the synopsis file providing a list of keywords associated with the special processing information and the material information, and
   a search engine for searching the relational database based on the keywords.

9. The computerized system of claim 1 wherein the request entry device further comprises a display device and an input device.

10. The computerized system of claim 1 wherein the process station device further comprises a display device and an input device.

11. A computerized system for providing special-processing instructions for processing materials in a production process, and for providing historical information related to the materials processed according to the special-processing instructions, the system comprising:
   a request entry device through which requesting personnel input special processing information indicating a way to process the materials differently from a normal way of processing of the materials,
   a communication network coupled to the request entry device,
   an instruction processing device coupled to the communication network for receiving the special processing information and generating the special-processing instructions based thereon, the special-processing instructions in the form of a sequential list of actions to be performed to process the materials,
   a process station device coupled to the communication network, the process station device associated with one or more of the actions to be performed at a processing station within a processing plant, each process station device for receiving an action from the instruction processing device via the communication network, for presenting the action to material-processing personnel, for receiving input from the material-processing personnel indicating one or more characteristics of the material processed according to the action, for generating an action-complete indication indicating that an action has been completed, and for providing the action-complete indication to the instruction processing device via the communication network,
   the instruction processing device further for receiving the action-complete indication from the process station device, for providing a next action from the sequential list to the associated process station device via the communication network after the action-complete indication associated with a most previous action is received, whereby the material-processing personnel may proceed to a next material processing action in the list only after completing all previous actions in the list,
   a relational database in which the special processing information and the material information are compiled and related, the relational database linked to the communication network, the relational database including a synopsis file associated with the special processing information and the material information, the synopsis file providing a summary of the special processing information and the material information, and a list of keywords associated with the special processing information and the material information,
   a search engine for searching the relational database based on the keywords, and
   an information retrieval device linked to the communication network for accessing the relational database via the communication network, and for using the search engine to find material information related to special processing information, or to find special processing information related to material information.

12. A computer-implemented method for providing special-processing instructions for processing materials in a production process, and for providing historical information related to the materials processed according to the special-processing instructions, the method including the steps of:
   (a) inputting special processing information indicating a way to process the materials differently from a normal way of processing of the materials,
   (b) generating the special-processing instructions based on special processing information,
   (c) presenting the special-processing instructions to material-processing personnel,
   (d) receiving material information from the material-processing personnel, where the material information indicates one or more characteristics of the material processed according to the special-processing instructions, and
   (e) compiling and relating the special processing information and the material information in a relational database.

13. The method of claim 12 including searching the relational database for material information related to special processing information.

14. The method of claim 12 including searching the relational database for special processing information related to material information.

15. The method of claim 12 further comprising:
   step (b) including generating the special-processing instructions as a sequential list of actions to be performed to process the materials according to the special processing information,
   step (c) including presenting an action from the sequential list to the material-processing personnel,
   (f) receiving input from the material-processing personnel indicating that the action is complete, and
   (g) presenting a next action from the sequential list to the material-processing personnel only after a most previous action is complete,
   whereby the material-processing personnel may proceed to a next action in the list only after completing all previous actions in the list.

16. The method of claim 15 wherein:
   step (f) includes receiving test data input from the material-processing personnel based on a test performed on the materials processed according to the special-processing instructions, and
   step (e) includes compiling and relating the special processing information and the test data in the relational database.

* * * * *